(12) United States Patent
Narasimhan et al.

(10) Patent No.: US 10,534,923 B2
(45) Date of Patent: Jan. 14, 2020

(54) SYSTEM AND METHOD FOR TRACKING AND MANAGING ADDITIVE MANUFACTURING OF COMPONENTS

(71) Applicant: Wipro Limited, Bangalore (IN)

(72) Inventors: Parthasarathy Narasimhan, Bangalore (IN); Hitarshi Meenketu Buch, Pune (IN)

(73) Assignee: Wipro Limited, Bangalore (IN)

( * ) Notice: Subject to any disclaimer, the term of this patent is extended or adjusted under 35 U.S.C. 154(b) by 266 days.

(21) Appl. No.: 15/856,207

(22) Filed: Dec. 28, 2017

(65) Prior Publication Data

US 2019/0147174 A1    May 16, 2019

(30) Foreign Application Priority Data

Nov. 14, 2017  (IN) .............................. 201741040596

(51) Int. Cl.
*G06F 21/60* (2013.01)
*G06Q 10/08* (2012.01)
(Continued)

(52) U.S. Cl.
CPC ............ *G06F 21/608* (2013.01); *B33Y 50/00* (2014.12); *G06F 21/105* (2013.01); *G06F 21/44* (2013.01);
(Continued)

(58) Field of Classification Search
CPC ...... G05F 21/608; G05F 21/105; G05F 21/44; G05B 2219/49023; G05B 19/4099
See application file for complete search history.

(56) References Cited

U.S. PATENT DOCUMENTS 7,190,478 B2    3/2007  Caffary, Jr. et al.
10,434,712 B1*  10/2019  Tran ........................ B29C 67/00
(Continued)

FOREIGN PATENT DOCUMENTS

WO    2017/090041 A1    6/2017

OTHER PUBLICATIONS

Jiang et al., Predicting the Future of Additive Manufacturing: A Delphi Study on Economic and Societal Implications of 3D Printing for 2030, Technological Forecasting & Social Change 117 (2017), pp. 84-97.
(Continued)

*Primary Examiner* — Sher A Khan
(74) *Attorney, Agent, or Firm* — Pepper Hamilton LLP

(57) ABSTRACT

A method and system for tracking and managing additive manufacturing of products includes formalizing a digital contract between a registered product owner and a registered additive manufacturing vendor. The digital contract includes an identification of a design file of the product, an identification of each registered additive manufacturing printer owned by the registered vendor, and an authorized quantity of products to be manufactured. The method further includes providing an access to the design file to the registered vendor upon formalization of the digital contract, and recording a print transaction data received from each registered printer. The print transaction data includes a quantity of products manufactured by the registered printer. The method further includes terminating the digital contract by revoking the access to the design file when the manufactured quantity equals the authorized quantity or upon violation of the digital contract.

17 Claims, 6 Drawing Sheets

(51) Int. Cl.
   *G06Q 50/18*     (2012.01)
   *B33Y 50/00*     (2015.01)
   *G06F 21/10*     (2013.01)
   *G06F 21/44*     (2013.01)
   *G05B 19/4099*   (2006.01)

(52) U.S. Cl.
   CPC ......... *G06Q 10/08* (2013.01); *G06Q 10/0833* (2013.01); *G06Q 10/0838* (2013.01); *G06Q 50/18* (2013.01); *G05B 19/4099* (2013.01); *G05B 2219/49023* (2013.01)

(56) References Cited

U.S. PATENT DOCUMENTS

| | | | |
|---|---|---|---|
| 2014/0223583 A1* | 8/2014 | Wegner | G06F 17/50 726/33 |
| 2015/0112472 A1* | 4/2015 | Chen | B29C 64/386 700/119 |
| 2017/0120519 A1* | 5/2017 | Mark | B33Y 10/00 |
| 2017/0155515 A1 | 6/2017 | Androulaki et al. | |
| 2018/0012311 A1* | 1/2018 | Small | B33Y 50/02 |
| 2018/0162066 A1* | 6/2018 | Bruwer | B33Y 30/00 |
| 2018/0341248 A1* | 11/2018 | Mehr | G05B 19/4099 |
| 2019/0004496 A1* | 1/2019 | Blom | B33Y 50/00 |
| 2019/0030878 A1* | 1/2019 | Barua | B29C 64/386 |
| 2019/0099953 A1* | 4/2019 | MacNeish, III | B33Y 30/00 |
| 2019/0187679 A1* | 6/2019 | Strudwicke | G05B 23/0235 |

OTHER PUBLICATIONS

Trouton et al., "3D Opportunity for Blockchain—Additive Manufacturing Links the Digital Thread", Deloitte, University Press, 2016, pp. 1-20.

* cited by examiner

SYSTEM AND METHOD FOR TRACKING AND MANAGING ADDITIVE MANUFACTURING OF COMPONENTS

This application claims the benefit of Indian Patent Application Serial No. 201741040596 filed Nov. 14, 2017, which is hereby incorporated by reference in its entirety.

FIELD

This disclosure relates generally to additive manufacturing, and more particularly to a method and system for tracking and managing additive manufacturing of products.

BACKGROUND

Additive manufacturing or 3D printing is an emerging technology, where a product is manufactured based on a digital design file or computer aided design (CAD) file. The additive manufacturing printers or 3D printers add the raw material of the product layer by layer, and then firm up each layer using laser so as to get the final product as per the specification of the digital design file. Initially, additive manufacturing technology was employed for rapid prototyping of products before the actual mass production begins. However, advancement in the field of additive manufacturing coupled with decline in cost of additive manufacturing have resulted in increasing adaption of additive manufacturing not only for rapid prototyping but also for mass production. For example, metal manufacturing industry is employing additive manufacturing technology for rapid prototyping. Further, plastic manufacturing, food products, and toys manufacturing industries are increasingly employing additive manufacturing for mass production.

As will be appreciated, for operationalizing the mass production through additive manufacturing, the design files or CAD files need to be shared by the owner or creator of the design to the additive manufacturing vendor who owns the additive manufacturing printers so as to physically manufacture the products. However, current techniques for sharing these design files between the design owner and additive manufacturing vendor have lot of threats related to ownership of the design files, security of the files, monitoring and tracking of the production process, and so forth. For example, there is a high risk of intellectual property (IP) theft and counterfeiting when sharing the digital design file with the additive manufacturing vendor using conventional file sharing techniques. In particular, it is difficult to authenticate the additive manufacturing vendor and control accessibility to digital design files through current techniques. Additionally, additive manufacturing needs to be tracked for usage to limit the printing quantity per contract. There is limited traceability in current techniques, and that too requires a lot of manual efforts. Further, current techniques fail to provide for credible authentication of the additive manufacturing printer.

SUMMARY

A method of tracking and managing additive manufacturing of a product includes formalizing a digital contract between a registered product owner and a registered additive manufacturing vendor. The digital contract includes a reference identification of a design file of the product, an identification of each of a plurality of registered additive manufacturing printers owned by the registered additive manufacturing vendor to be employed for additive manufacturing of the product based on the design file, and an authorized quantity of products to be manufactured by the registered additive manufacturing vendor. The method further includes providing an access to the design file to the registered additive manufacturing vendor upon formalization of the digital contract for additive manufacturing of the product using the plurality of registered additive manufacturing printers. The method further includes recording a print transaction data received from each of the plurality of registered additive manufacturing printers. The print transaction data includes a quantity of products manufactured by the registered additive manufacturing printer. The method further includes terminating the digital contract by revoking the access to the design file when the quantity of products manufactured equals the authorized quantity of products to be manufactured or upon violation of the digital contract.

A system for tracking and managing additive manufacturing of a product includes at least one processor and a memory communicatively coupled to the at least one processor. The memory stores processor-executable instructions, which, on execution, cause the processor to formalize a digital contract between a registered product owner and a registered additive manufacturing vendor. The digital contract includes a reference identification of a design file of the product, an identification of each of a plurality of registered additive manufacturing printers owned by the registered additive manufacturing vendor to be employed for additive manufacturing of the product based on the design file, and an authorized quantity of products to be manufactured by the registered additive manufacturing vendor. The processor-executable instructions, on execution, further cause the processor to provide an access to the design file to the registered additive manufacturing vendor upon formalization of the digital contract for additive manufacturing of the product using the plurality of registered additive manufacturing printers. The processor-executable instructions, on execution, further cause the processor to record a print transaction data received from each of the plurality of registered additive manufacturing printers. The print transaction data includes a quantity of products manufactured by the registered additive manufacturing printer. The processor-executable instructions, on execution, further cause the processor to terminate the digital contract by revoking the access to the design file when the quantity of products manufactured equals the authorized quantity of products to be manufactured or upon violation of the digital contract.

A non-transitory computer-readable medium storing computer-executable instructions for tracking and managing additive manufacturing of a product includes stored instructions, when executed by a processor, cause the processor to perform operations including formalizing a digital contract between a registered product owner and a registered additive manufacturing vendor. The digital contract includes a reference identification of a design file of the product, an identification of each of a plurality of registered additive manufacturing printers owned by the registered additive manufacturing vendor to be employed for additive manufacturing of the product based on the design file, and an authorized quantity of products to be manufactured by the registered additive manufacturing vendor. The operations further include providing an access to the design file to the registered additive manufacturing vendor upon formalization of the digital contract for additive manufacturing of the product using the plurality of registered additive manufacturing printers. The operations further include recording a print transaction data received from each of the plurality of registered additive manufacturing printers. The print transaction data includes a quantity of products manufactured by the registered additive manufacturing printer. The operations further include terminating the digital contract by revoking the access to the design file when the quantity of products manufactured equals the authorized quantity of products to be manufactured or upon violation of the digital contract.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
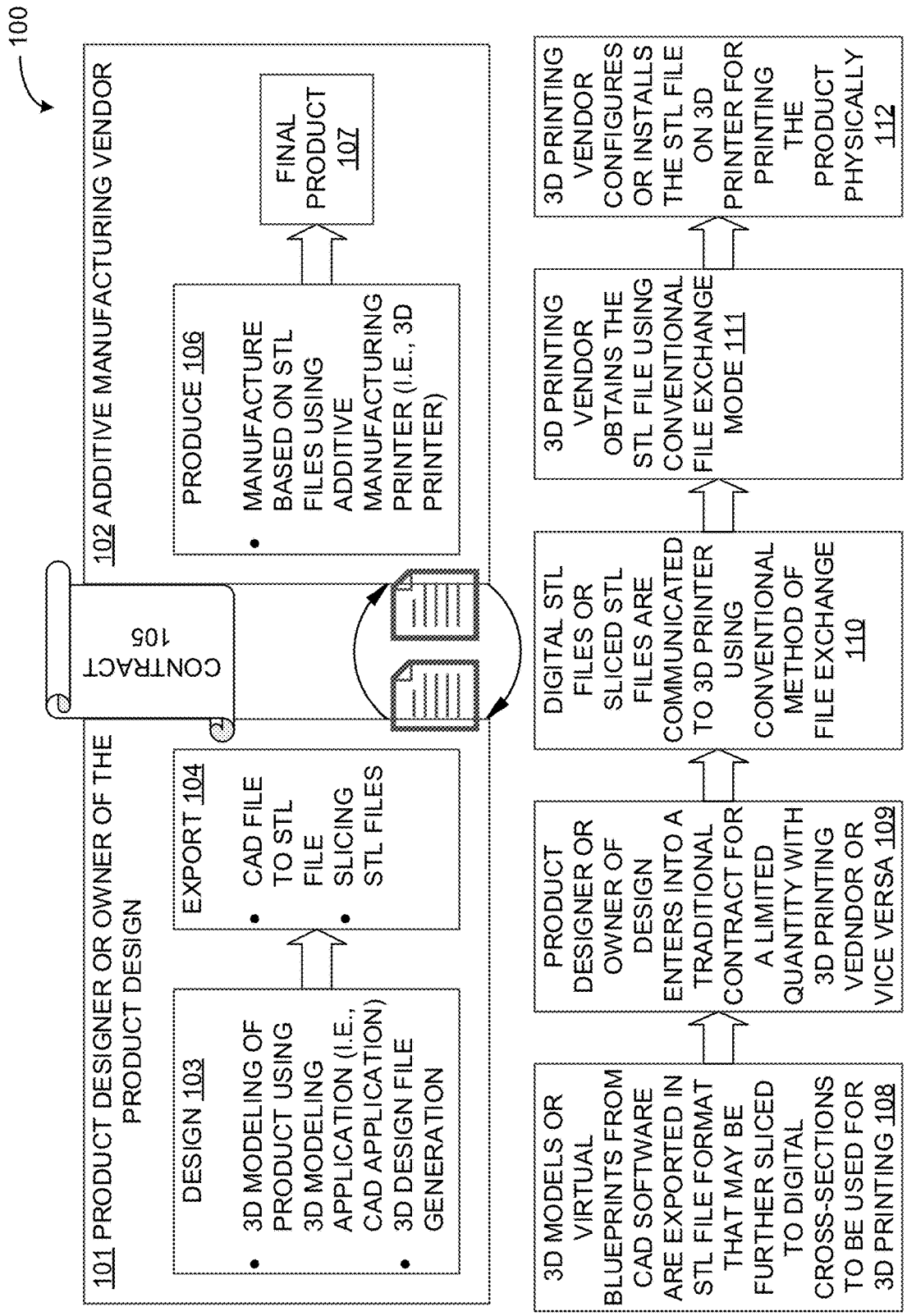
FIG. 1 illustrates a typical system for tracking and managing additive manufacturing of a product.

Referring now to FIG. 1, a typical system 100 for tracking and managing additive manufacturing of a product is illustrated. The system 100 includes a product designer or an owner of the product design 101 and an additive manufacturing vendor 102. It should be noted that, in some embodiments, the product designer may as well be the owner of the product design. Alternatively, in some embodiments, the product designer may be an independent designer contracted by the owner of the product design. Thus, the product designer or the owner of the product design 101 may design the product for subsequent manufacturing at block 103. The product designing at block 103 may involve creating a three-dimensional (3D) digital model of the product using a 3D modeling application (i.e., a computer aided design (CAD) application), and subsequently generating a 3D design file (i.e., CAD file). The product designer or the owner of the product design 101 may then export the 3D design file for use by the additive manufacturing printers (3D printers) at block 104. The file export at block 104 may involve converting the 3D design file into an additive manufacturing design file (e.g., a stereolithography (STL) file), and subsequently slicing the additive manufacturing design file (e.g., STL file).

The product designer or the owner of the product design 101 may then enter into a traditional contract 105 with the additive manufacturing vendor 102 for additive manufacturing (3D printing) of the product. The contract may specify various terms and conditions with respect to additive manufacturing of the product such quantity of products to be manufactured, manufacturing and delivery schedule, payment schedule, contract violation terms, terms with respect to intellectual property (IP) theft, and so forth. Upon execution of the traditional contract between the owner of the product design 101 with the additive manufacturing vendor 102, the owner of the product design 101 may share the additive manufacturing design file with the additive manufacturing vendor 102 using conventional file sharing techniques, such as file transfer protocol (FTP), etc.

The additive manufacturing vendor 102 may obtain the design file of the product from the owner of the product design 101, and may then produce the product based on the design file at block 106. The product production at block 106 may involve configuring or installing the design file on the additive manufacturing printer, and manufacturing the final product based on the design file using the additive manufacturing printer. The manufactured product or the final product 107 may then be supplied to the owner of the product design 101 as per the terms of the traditional contract 105.

Thus, a typical additive manufacturing process may include generation of 3D design model or virtual blueprint of a product using CAD software and exporting of the design model from CAD software in STL file format at step 108. The STL file may be further sliced to digital cross-sections to be used for additive manufacturing. The process may further include execution of a traditional contract between the product designer or the owner of the product design, and the additive manufacturing vendor for additive manufacturing of the product for a limited quantity at step 109. The process may further include sending of the STL design file or the sliced STL design files from the product designer or the owner of the product design to the additive manufacturing vendor using conventional file exchange technology (e.g., FTP) at step 110. The process may further include receiving of the STL design file or the sliced STL design files by the additive manufacturing vendor at step 111. The process may further include configuration or installation of the STL design file or the sliced STL design files on the additive manufacturing printer by the additive manufacturing vendor for additive manufacturing of the product at step 112.

As stated above, in the current scenario, the design file is shared using conventional file sharing methodology, such as FTP, and the contract between the design file owner and the additive manufacturing vendor may be manual paper based contract. It is therefore challenging for the owner/creator of the design file to secure the access to design file, retain the ownership of the design file, control the usage of design file for actual manufacturing, and restrict the number of manufactured quantity to contracted quantity. For example, conventional authentication of vendor may lead to security breaches while there is limited scope of authentication of the additive manufacturing machine. Further, the digital design file is not secured as it is shared through conventional file exchange mode. Managing the IP of design file is therefore a cumbersome exercise for the design file owner. Additionally, any delayed communication with respect to changes in the design file may delay the production. The unauthorized altering of design files or potential tampering of the design file may break the design file. Moreover, there is limited or no tracking of actual usage of the design file, or the manufactured quantity using the design file shared. As stated above, additive manufacturing needs to be tracked for usage to limit the manufactured quantity as per contract, and may require a lot of manual efforts. Any counterfeiting resulting from such breach may harm reputation of the design file owner, and in some cases may even put lives at risk when sub-par materials are used.

It is therefore desirable to provide an efficient, secure, and trustworthy technique for tracking and managing additive manufacturing of products. It is also desirable to provide a technique with enhanced transparency and accountability among various entities involved in additive manufacturing of a product.

Figure 2:
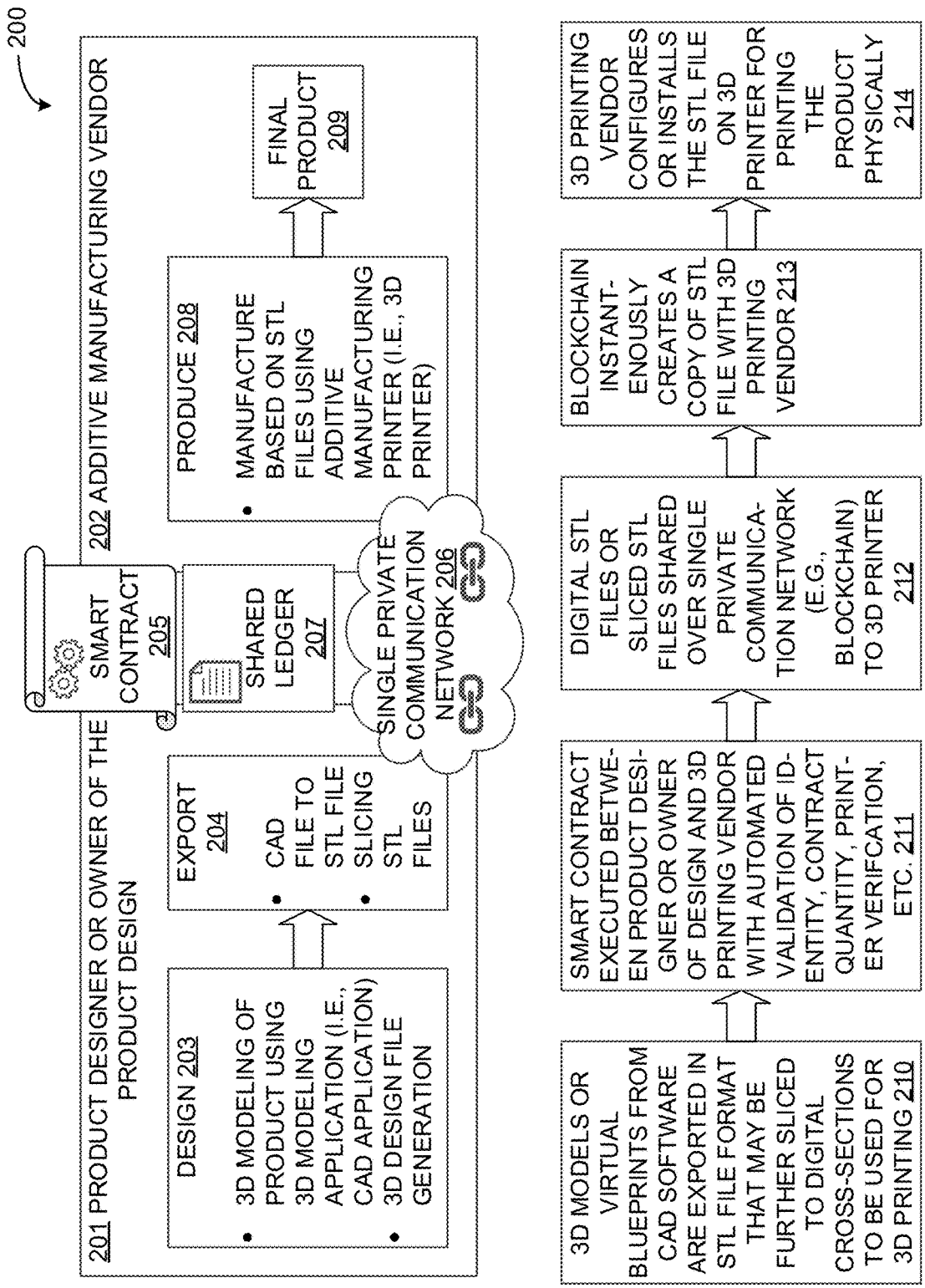
FIG. 2 illustrates an exemplary system for tracking and managing additive manufacturing of a product in accordance with some embodiments of the present disclosure.

Referring now to FIG. 2, an exemplary system 200 for tracking and managing additive manufacturing of a product is illustrated, in accordance with some embodiments of the present disclosure. As above, in the illustrated system 200, the product designer 201 may employ CAD application to develop virtual blueprints or 3D digital models of the product at block 203. The CAD model may further enable modification, analysis, or optimization of a 3D digital design file of the product. These virtual blueprints or 3D models may then be exported in STL file format from CAD application at block 204. These virtual blueprints in STL file formats may be further sliced into digital cross sections. As stated above, these sliced digital cross sections may be employed for additive manufacturing.

Further, in accordance with some embodiments of the present disclosure, after slicing digital files, a smart contract 205 may be executed between product designer and additive manufacturing vendor 202. The executed smart contract 205 may include automated validation of identity of vendor, verification of the additive manufacturing printer employed by the vendor, quantity of manufactured product as per contract, and so forth. The sliced digital STL files may then be shared with additive manufacturing printer using a single private communication network 206, which may include, but is not limited to, a blockchain network, a permissioned blockchain network, a hashgraph network, and so forth. The single private communication network 206 may create a copy of sliced digital files or STL file with the additive manufacturing vendor 202. After obtaining copy of STL files, the additive manufacturing vendor 202 may then produce the product based on the design file at block 208. As above, the product production at block 208 may involve configuring and installing the digital file on the additive manufacturing printer for manufacturing the final product 209 physically.

It should be noted that, for each uploaded STL files on additive manufacturing printer, an encrypted hash file may be created in accordance with some embodiments of the present disclosure. Thus, each encrypted hash file may refer to a specific part of additive manufacturing print. In some embodiments, the encrypted hash file may also provide specific unique serial number for that specific part which requires to be printed. Moreover, all changes which may be carried out in the STL file, may be updated in a shared ledger 207 provided by the single private communication network 206. As will be appreciated, to track and manage additive manufacturing vendors and their additive manufacturing printers, a unique identifier may be provided to each vendor and each printer by the single private communication network 206 using blockchain technology or other such technology. Further, each printing machine may be provided with provision of authentication to have secure access with a wrapper program.

The smart contract 205 may be further employed to manage contracts between design owner 201 and vendors 202. For example, smart contract 205 may help verifying and validating vendor and printers. Thus, after executing smart contract 205 between design owner 201 and printing vendors 202, smart contracts 205 may authorize each vendor 202 who is responsible for specific task. The STL files related to specific task may then be authorized and allocated to that vendor 202. The use of allocated STL files to vendor may be further controlled and restricted to identified printers based upon smart contract. Additionally, after allocating of STL files for printing, internet of things (IOT) based data capturing mechanism related to printing job and STL files may be tracked closely by design owner 201. The event data captured using IOT based mechanism may also help to verify printing quantity and printer automatically.

Thus, an exemplary additive manufacturing process may include generation of 3D design model or virtual blueprint of a product using CAD software and exporting of the design model from CAD software in STL file format at step 210. The STL file may be further sliced to digital cross-sections to be used for additive manufacturing. The process may further include execution of a smart contract between the product designer and the additive manufacturing vendor with automated validation of vendor identity, tracking of contract quantity, verification of printers, and so forth at step 211. The process may further include sharing of the STL design file or the sliced STL design files over single private communication network (e.g., blockchain network, hashgraph network, etc.) to the additive manufacturing printer at step 212. The process may further include creating a copy of the STL design file or the sliced STL design files by the single private communication network for the additive manufacturing printer at step 213. The process may further include configuration or installation of the STL design file or the sliced STL design files on the additive manufacturing printer by the additive manufacturing vendor for additive manufacturing of the product at step 214.

Figure 3:
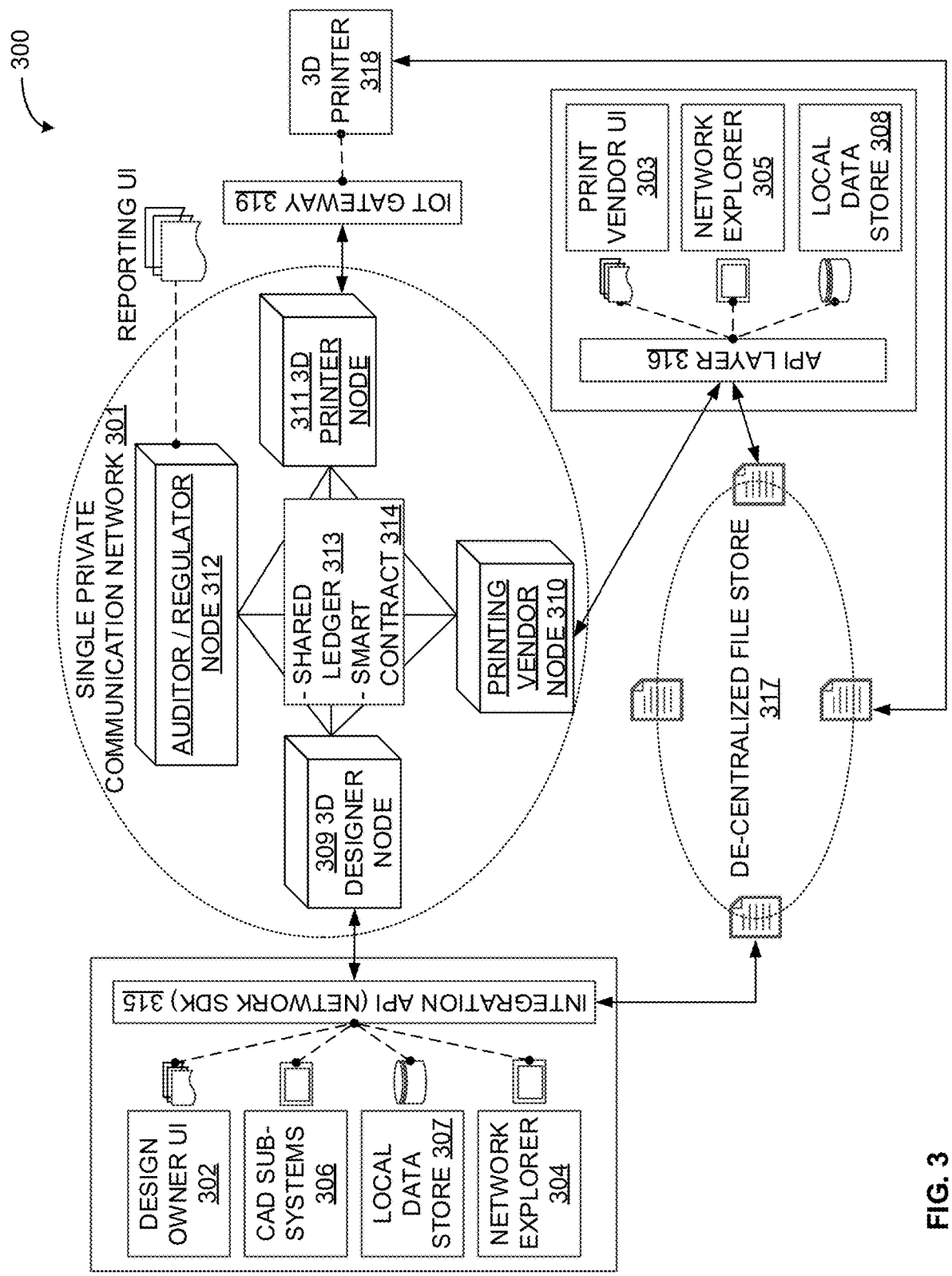
FIG. 3 illustrates an architecture of the exemplary system of FIG. 2 for tracking and managing additive manufacturing of a product in accordance with some embodiments of the present disclosure.

Referring now to FIG. 3, an architecture of an exemplary system 300 for tracking and managing additive manufacturing of products is illustrated, in accordance with some embodiments of the present disclosure. The architecture depicts various components and modules that work together to implement the overall system 300. The additive manufacturing tracking and management system 300 may include two broad aspect of system: off chain components and a single private communication network 301. The off-chain components may include a variety of applications that acts as an interface between business systems and the single private communication network 301. For example, the off-chain components may broadly include four subsystems: user subsystems (e.g., designer or owner user interface (UI) 302, print vendor UI 303, etc.); network explorers 304, 305; CAD subsystems 306; and local data storage subsystems 307, 308. These subsystems may be connected with the single private communication network using system interfaces 315, 316 such as network software development kit (SDK) OR integration application programming interface (API).

The single private communication network 301 (e.g., blockchain network, permissioned blockchain network, hashgraph network, etc.) may connect all entities 309-312 in the entire supply chain for tracking and managing additive manufacturing. The entities may include, but are not limited to, a design owner 309, an additive manufacturing vendor 310, an additive manufacturing printer 311, and an auditor or a regulator 312. Thus, each of the entities 309-312 may be connected with the other via the single private communication network 301 using a shared ledger facility 313 and/or smart contracts facility 314, provided by the single private the communication network 301. For example, the shared ledger facility 206 and the smart contract facility 207 may be similar to or based on blockchain shared ledger and smart contract facilities. The shared ledger 313 may contain information about STL data and usage transaction. The shared ledger 313 may therefore provide for tracking of any changes in the STL files. The smart contract facility 314 may facilitate to register designers, vendors and printers, establish agreements, and track print transactions. For example, the smart contract 314 may provide for mutually agreed terms and conditions among entities 309-312, such as between the product designer 309 and the additive manufacturing vendor 310. The smart contract 314 may also be responsible for managing STL files, validating additive manufacturing vendors, verifying printers, and tracking print usage (e.g., tracking manufactured quantity against contracted quantity).

The single private communication network 301 enables quick accessibility using unique references (for example, block references), thereby making convenient tracking of design files, usage of design files, vendors, printers, manufactured quantity, and so forth. The single private communication network 301 further enables instant exploration, thereby making convenient any auditing task. As stated, the single private communication network 301 may be a decentralized network based on blockchain based technology such as a permissioned blockchain network. The blockchain based technology provides many advantages. For example, all transactions in blockchain network are performed through verifiable immutable transaction blocks. Thus, any transaction may not be altered or deleted. Further, blockchain based technology provides for distributed database, and single public ledger facility or shared ledger facility 313, thereby allowing instant availability of any information on digital assets to all participating nodes or entities 309-312 in the blockchain network. This enables in reduction of clutter and complications of multiple ledgers. Additionally, in some embodiments, the permission to access the permissioned blockchain network may be managed by the respective parties, and every transaction is authorized based on consensus. The permissioned peer-to-peer model for all participating nodes or entities 309-312 with equal stake in the blockchain network ensures distributed ownership and risk amongst all stakeholders. Moreover, the use of cryptography ensures that the digital assets are stored in a safe and secured manner.

The application of blockchain technology provides an automatic audit trail, thereby enabling tracking and tracing of the state of a digital asset. The shared ledger facility 313 is accessible by every participating node (i.e., entities) 309-312 of the blockchain network 301, thereby ensuring that a tamper-proof and reliable version of data is available for validation and verification purposes to all participants. By enhancing accountability of each participant in the supply chain, blockchain may also prevent counterfeiting of products and ensure that each product is being manufactured by a genuine vendor authorized to manufacture that product. Smart contracts facility 314 may be leveraged to introduce automation and improvement in the business process of maintaining logs of manufactured products.

Further, the blockchain network 301 may include additive manufacturing vendor node 310 accessible to the additive manufacturing vendors, who may want to manufacture a product by utilizing the product design files by getting into an agreement with the design owners. As above, the vendors may interact with the additive manufacturing vendor node 310 through the print vendor UI 303 and the network explorer 305. The local data store 308 may also store any other data or information pertaining to the vendor with respect to the blockchain network 301 such as vendor identification, authorization code, associated printer identification, and so forth. Additionally, the blockchain network 301 may include additive manufacturing printer node 311 in communication with the additive manufacturing printers 318 through an IOT gateway 319 for capturing information from printers 318 such as printing events. Moreover, in some embodiments, the blockchain network 301 may include regulator or auditor node accessible to an auditor or a regulator. The auditor or the regulator node may be used for providing reports on the additive manufacturing design and print transactions from compliance perspective.

As discussed above, the user interfaces 302, 303 may be designed and developed to access different systems and subsystems of the additive manufacturing tracking and management system 300. For example, in some embodiments, the user interface (UI) may be developed as distributed application, which may connect and access different systems and subsystems to execute number of functionality. The distributed UI may facilitate registration of design owners, print vendors, and printers onto the blockchain network 301. The distributed UI may also enable the design owners to upload design files and to participate in workflow by establishing agreement with print vendors. The distributed UI may further enable print vendors to register their printers and to participate in workflow by establishing agreement for usage of the design file. Moreover, the distributed UI application may allow regulators and auditors to retrieve and to view agreements and related transactions.

Further, the CAD subsystems 306 may be employed by product designers to create CAD design files and to export them as STL files for additive manufacturing. As stated above, the design files may be stored in the decentralized file storage system 317 may. In some embodiments, the STL files which represent 3D designs may be securely stored and retrieved by using different file systems such as inter planetary file system (IPFS). Each STL file may be shared and stored in multiple file systems so as to ensure security and availability. Further, each STL file may be represented by a digital hashtag which may be stored in the blockchain network 301.

The integration API layer or the blockchain SDK 315, 316 may facilitate the interaction between off chain components and the blockchain network 301 as well as between off chain components and the decentralized file storage system 317. Similarly, the IOT gateway 319 may provide for capturing information from the additive manufacturing printers 318 registered with the blockchain network. The IoT gateway 319 may enable capturing of events from the printer 318 and relaying the same to the blockchain network 301. Further, local data storage 307, 308 may be used to store reference data as well as user or role information, which may be used locally by each of the participants.

The smart contract functionality 314 may provide four broad different features for managing additive manufacturing. First, the smart contract functionality 314 may provide for onboarding and registration of product designers, printing vendors, and 3D printers. Secondly, the smart contract functionality 314 may provide for identity validation of product designers and printing vendors, and authorization rules for different entities. Third, the smart contract functionality 314 may provide for capturing of agreement terms and conditions between product designer and printing vendor. Fourth, the smart contract functionality 314 may enable printing vendor to track and retrieve product designs, and provide for tracking number of prints executed by the 3D printer.

For example, for managing product designers, the smart contracts 314 may provide for functionality such as addition and verification for designers. The smart contracts 314 may also facilitate carrying out update and verification of design files. Further, the smart contracts 314 may facilitate creating agreement between the product designer and the printing vendor. Similarly, for managing printing vendors and 3D printers, the smart contracts 314 may assign and verify printing vendors, printers, and print transactions along with printer details.

It should be noted that the regulatory certificate tracking and management system 200, 300 may be implemented in programmable hardware devices such as programmable gate arrays, programmable array logic, programmable logic devices, and so forth. Alternatively, the system 200, 300 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

Further, as will be appreciated by one skilled in the art, a variety of processes may be employed for tracking and managing additive manufacturing of a product. For example, the exemplary system 200, 300 may track and manage additive manufacturing of the product by the processes discussed herein. In particular, as will be appreciated by those of ordinary skill in the art, control logic and/or automated routines for performing the techniques and steps described herein may be implemented by the system 200, 300, either by hardware, software, or combinations of hardware and software. For example, suitable code may be accessed and executed by the one or more processors on the system 200, 300 to perform some or all of the techniques described herein. Similarly, application specific integrated circuits (ASICs) configured to perform some or all of the processes described herein may be included in the one or more processors on the system 200, 300.

Figure 4:
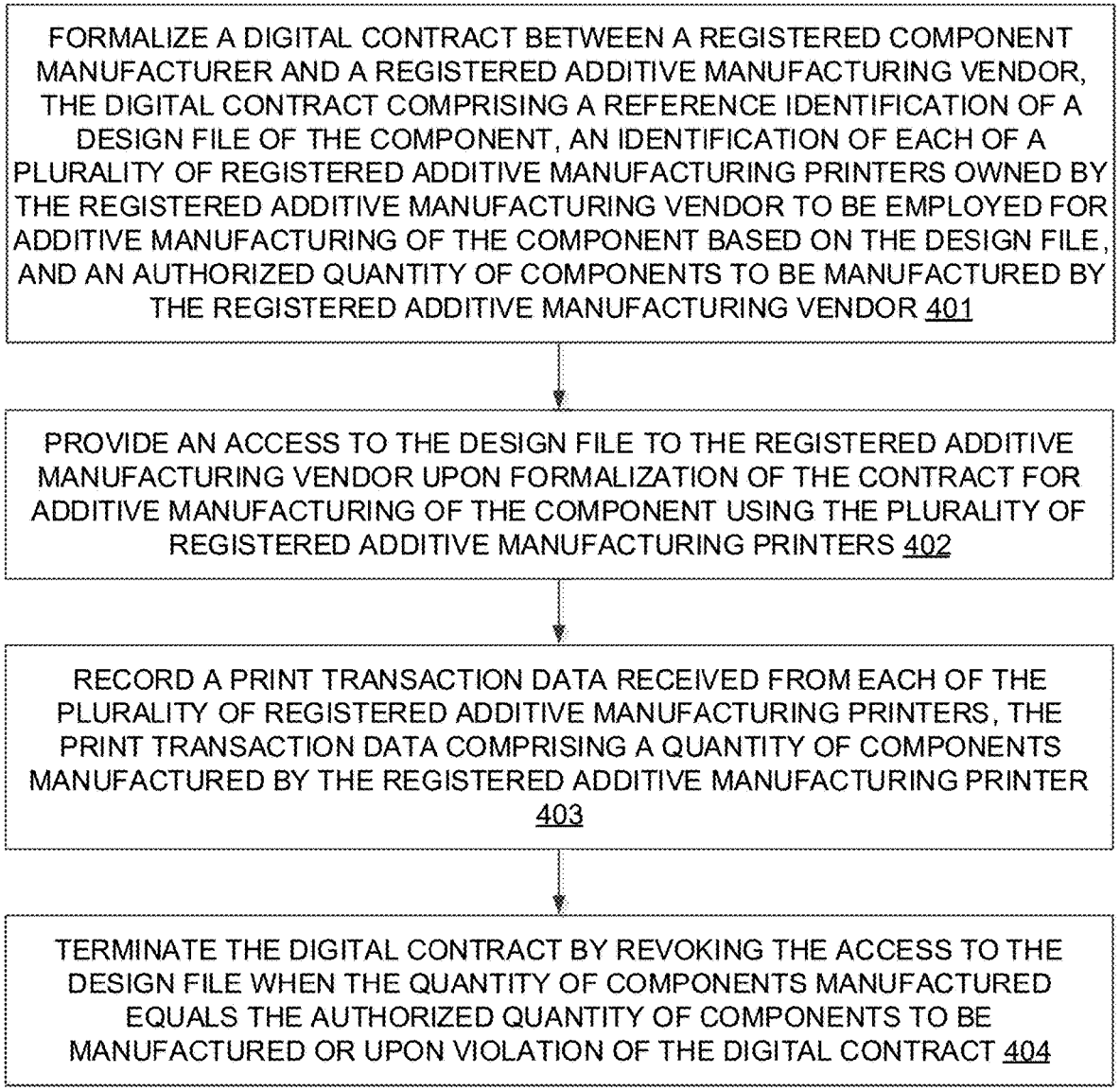
FIG. 4 is a flow diagram of an exemplary process for tracking and managing additive manufacturing of a product in accordance with some embodiments of the present disclosure.

For example, referring now to FIG. 4, exemplary control logic 400 for tracking and managing additive manufacturing of a product via a system, such as system 200, 300, is depicted via a flowchart in accordance with some embodiments of the present disclosure. As illustrated in the flowchart, the control logic 400 may include the step of formalizing a digital contract between a registered product owner and a registered additive manufacturing vendor at step 401. The digital contract may include a reference identification of a design file of the product, an identification of each of a plurality of registered additive manufacturing printers owned by the registered additive manufacturing vendor to be employed for additive manufacturing of the product based on the design file, and an authorized quantity of products to be manufactured by the registered additive manufacturing vendor. The control logic 400 may further include the steps of providing an access to the design file to the registered additive manufacturing vendor upon formalization of the digital contract for additive manufacturing of the product using the plurality of registered additive manufacturing printers at step 402, and recording a print transaction data received from each of the plurality of registered additive manufacturing printers at step 403. The print transaction data may include a quantity of products manufactured by the registered additive manufacturing printer. The control logic 400 may further include the step of terminating the digital contract by revoking the access to the design file when the quantity of products manufactured equals the authorized quantity of products to be manufactured or upon violation of the digital contract at step 404.

In some embodiments, the control logic 400 may further include the step of registering a plurality of entities involved in a plurality of stages of additive manufacturing of the product. The plurality of entities may include at least one of a product owner, a product designer, an additive manufacturing vendor, an additive manufacturing printer owned by the additive manufacturing vendor, an auditor, or a regulator.

Further, in some embodiments, registering the plurality of entities may include creating a blockchain network comprising a plurality of nodes, and a single shared ledger for the plurality of nodes for storing a plurality of transactions with respect to the design file and the digital contract. In such embodiments, registering the plurality of entities may further include registering the plurality of entities as the plurality of nodes in the blockchain network. Additionally, in such embodiments, the blockchain network is a permissioned blockchain network. Further, in such embodiments, a permission to access the blockchain network is managed by at least one of the plurality of entities. Moreover, in such embodiments, a transaction among two or more of the plurality of entities is authorized based on a consensus. In such embodiments, providing the access to the design file at step 402 may include transferring a copy the design file to the registered additive manufacturing vendor using the blockchain network by creating the copy of the design file and a verifiable immutable transaction block corresponding to a transaction of transferring the copy of the design file, and recording a change made to the copy of the digital file in the shared ledger using the verifiable immutable transaction block.

In some embodiments, the control logic 400 may further include the steps of receiving the design file from the registered product owner or a registered designer contracted by the registered product owner, and storing the design file in a de-centralized file store with the reference identification. Additionally, in some embodiments, formalizing the digital contract at step 401 may include the steps of initiating the digital contract with respect to the design file upon receiving a request from the registered additive manufacturing vendor or the registered product owner, and, upon initiation, iteratively capturing terms and conditions between the registered product owner and the registered additive manufacturing vendor for additive manufacturing of the product until an acceptance of the terms and the conditions, a rejection of the terms and the conditions, and an expiry of a pre-defined or a pre-configured time interval for acceptance. Moreover, in some embodiments, the control logic 400 may further include the step of processing payment based on the terms and the conditions of the digital contract.

Figure 5:
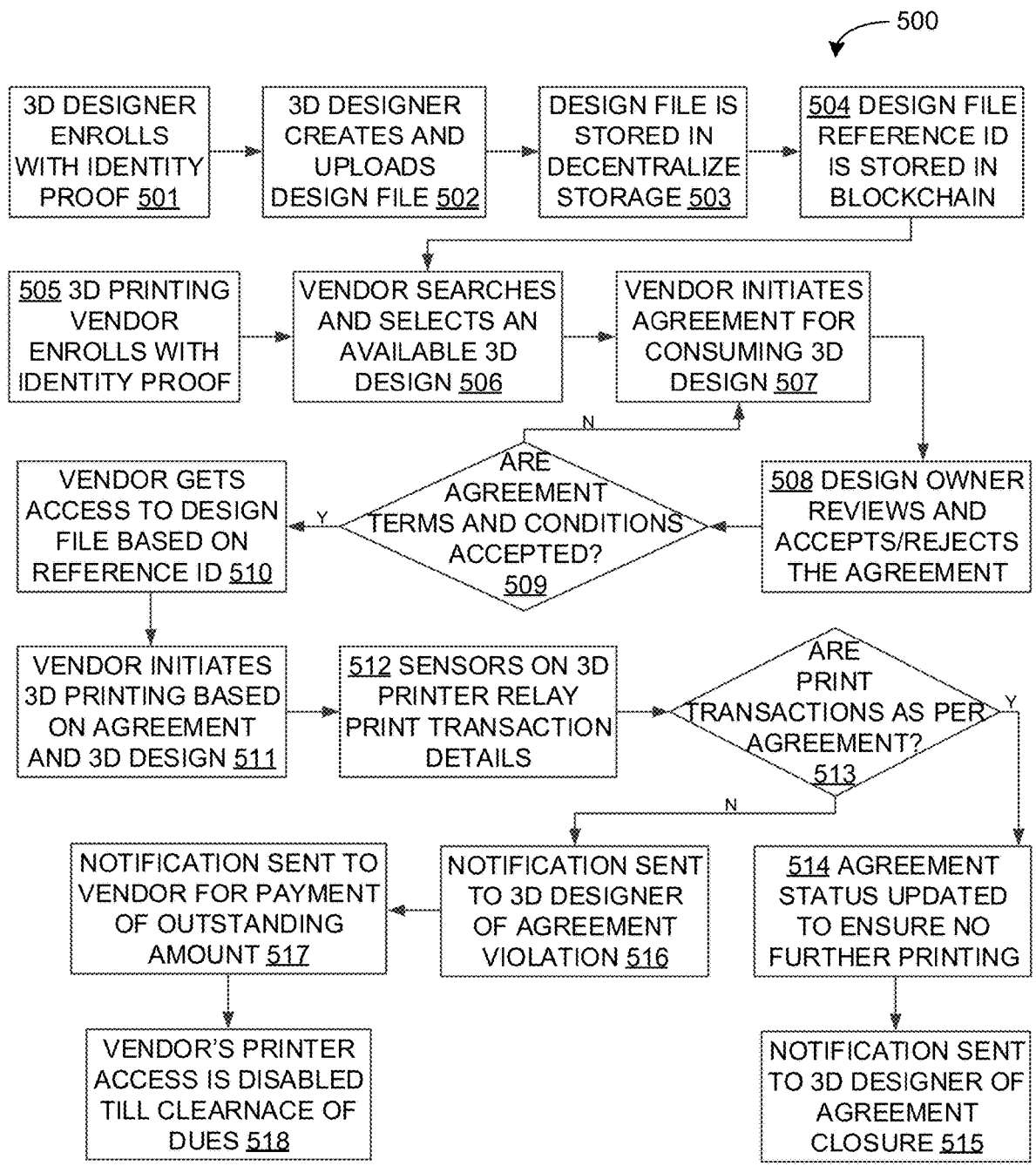
FIG. 5 is a flow diagram of a detailed exemplary process for tracking and managing additive manufacturing of a product in accordance with some embodiments of the present disclosure.

Referring now to FIG. 5, exemplary control logic 500 for tracking and managing additive manufacturing of a product is depicted in greater detail via a flowchart in accordance with some embodiments of the present disclosure. As illustrated in the flowchart, at step 501, product designers or design owners may register themselves with the additive manufacturing tracking and management system with identity proof In some embodiments, the product designer may be provided with details such as design owner ID along with designer name and location. Designer may also be provided with registration date and design file array. Upon registration, at step 502, the product designer may create and upload design files which they want to print. It should be noted that the design files may be STL design file. At step 503, the STL design files may be stored in decentralized storage system. Further, at step 504, a reference identification is generated for each of the stored design file, and the generated reference identification is stored in the blockchain network.

Independently, at step 505, printing vendor may register themselves with the additive manufacturing tracking and management system with identity proof. In some embodiments, the printing vendor may be provided with details such as vendor ID along with vendor name and location. Printing vendors may also be provided with registration date and printer array. Upon registration, at step 506, printing vendor may search and select an available design file for additive manufacturing. At step 507, the printing vendor may then initiate an agreement with the registered product designer for consuming the design file. At step 508, the product designer may review and evaluate terms and conditions of the agreement. As discussed above, the agreement may include agreement identification, agreement status, design owner identification, vendor identification, design file reference identification, printer identification, agreement start date, agreement end date, allowed print transactions, actual print transactions, amount per print, due amount, paid amount, and so forth.

At step 509, the design owner takes decision whether to accept or reject the agreement based on the review. If the design owner rejects the agreement at step 509, the control logic 500 stops or flows back to step 507 where the printing vendor may modify the agreement for further consideration by the design owner. However, if the design owner accepts the terms and the conditions of the agreement at step 509, the control logic proceeds further. At step 510, the printing vendor may get an access to actual design file based on reference identification in the blockchain. At step 511, the printing vendor may initiate additive manufacturing based on the agreement and the design file provided. At step 512, the IOT sensors on the additive manufacturing printers may relay the print transaction details.

At step 513, the print transaction details may be analyzed to determine conformity with the agreement. For example, it is determined if the quantity of manufactured product equals agreed quantity, if the payment dues are clear as per terms of the agreement, and so forth. If all the agreement conditions are met at step 513, then, at step 514, the agreement status may be updated to restrict further access to design file and to stop any further printing. At step 515, a notification may be sent to the design owner and/or the printing vendor of agreement closure. However, if the agreement conditions are not met at step 513 (i.e., if there is a violation), then, at step 516, a notification may be sent to the design owner and/or printing vendor of agreement violation. Additionally, at step 517, a notification may be sent to the printing vendor for payment of outstanding amount. If print vendor does not pay according to the agreement, another notification is sent to print vendor for agreement violation. Further, to provide secure payment transaction to the design owner, at step 518, distributed blockchain may disable vendor' printer access till the dues are not cleared by print vendor. It should be noted that the agreement status update happens all over blockchain for ensuring that no further printing happens till agreement violations are not settled.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
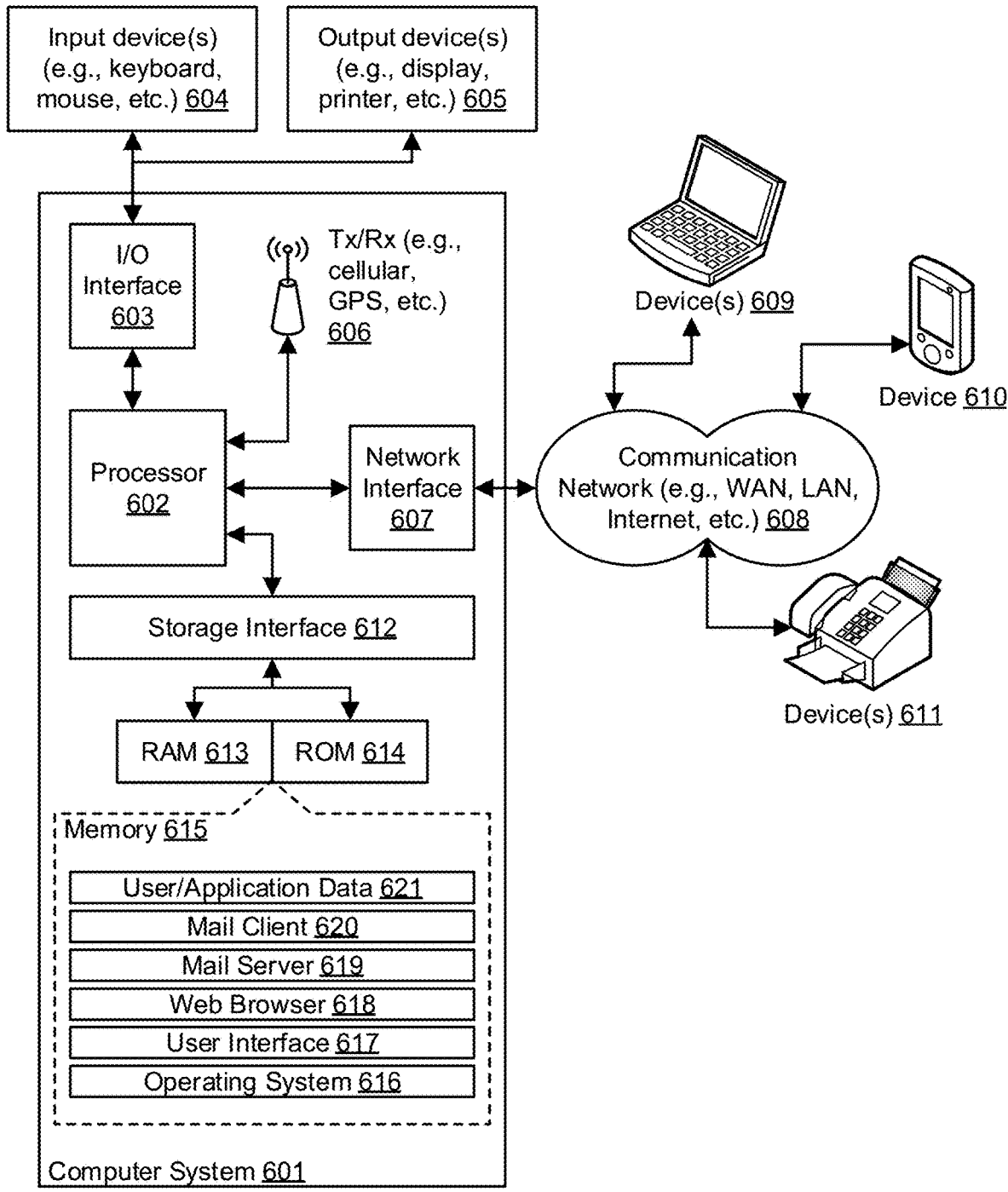
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 200, 300 for tracking and managing tracking and managing additive manufacturing of products. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.), collectively referred to as memory 615, via a storage interface 612. The storage interface 612 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 615 may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., digital files, reference identification of digital files, design owner identification, printing vendor identification, printer identification, digital contract, terms and conditions, print transaction data, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for an efficient, secure, and trustworthy mechanism for tracking and managing additive manufacturing of products. Additionally, the techniques enable efficient tracking of the design files and printed quantities, thereby providing for enhanced security against IP theft of design file and better prevention of counterfeiting. Further, the techniques provide for decentralized governance, increased trust, and enhanced transparency and accountability between design owner and the printing vendors.

Further, as will be appreciated by those skilled in the art, the techniques described in the various embodiments discussed above provide for sharing of design files through blockchain using blockchain private permissioned network. The techniques further provide for smart contract with specific rules for owner, vendor, and printer identification and printing authentication. The techniques further provide for IOT based printers that are linked to the blockchain for tracking digital file usage as per contract. Thus, the techniques provide for tracking printed quantity by directly communicating the usage of the design file from the printing machine, and recording the communication in the blockchain network as a transaction. The production quantity is then automatically compared against contracted quantity as per agreement between the parties using smart contract feature of the blockchain.

The specification has described system and method for tracking and managing additive manufacturing of products. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method comprising:
formalizing, by an additive manufacturing tracking and management system, a digital contract between a registered product owner and a registered additive manufacturing vendor, the digital contract comprising a reference identification of a design file of the product, an identification of each of a plurality of registered additive manufacturing printers owned by the registered additive manufacturing vendor is employed to manufacture additive product based on the design file, and an authorized quantity of products to be manufactured by the registered additive manufacturing vendor;
providing, by the additive manufacturing tracking and management system, an access to the design file to the registered additive manufacturing vendor upon formalization of the digital contract to manufacture additive product using the plurality of registered additive manufacturing printers;
recording, by the additive manufacturing tracking and management system, a print transaction data received from each of the plurality of registered additive manufacturing printers, the print transaction data comprising a quantity of products manufactured by the registered additive manufacturing printer; and
terminating, by the additive manufacturing tracking and management system, the digital contract by revoking the access to the design file when the quantity of products manufactured equals the authorized quantity of products to be manufactured or upon detection of violation of the digital contract;
wherein the formalizing the digital contract further comprises initiating the digital contract with respect to the design file upon receiving a request from the registered additive manufacturing vendor or the registered product owner and, upon initiation, iteratively capturing terms and conditions between the registered product owner and the registered additive manufacturing vendor to manufacture additive product until an acceptance of the terms and the conditions, a rejection of the terms and the conditions, and an expiry of a pre-defined or a pre-configured time interval for acceptance.

2. The method of claim 1, further comprising registering a plurality of entities involved in a plurality of stages of additive manufacturing of the product, the plurality of entities comprising at least one of a product owner, a product designer, an additive manufacturing vendor, an additive manufacturing printer owned by the additive manufacturing vendor, an auditor, or a regulator.

3. The method of claim 2, wherein the registering the plurality of entities comprises:
creating a blockchain network comprising a plurality of nodes, and a single shared ledger for the plurality of nodes for storing a plurality of transactions with respect to the design file and the digital contract; and
registering the plurality of entities as the plurality of nodes in the blockchain network.

4. The method of claim 3, wherein the blockchain network is a permissioned blockchain network, wherein a permission to access the blockchain network is managed by at least one of the plurality of entities, and wherein a transaction among two or more of the plurality of entities is authorized based on a consensus.

5. The method of claim 3, wherein the providing the access to the design file comprises transferring a copy the design file to the registered additive manufacturing vendor using the blockchain network by:

creating the copy of the design file and a verifiable immutable transaction block corresponding to a transaction of transferring the copy of the design file; and recording a change made to the copy of the digital file in the shared ledger using the verifiable immutable transaction block.

6. The method of claim 1, further comprising:

receiving the design file from the registered product owner or a registered designer contracted by the registered product owner; and storing the design file in a de-centralized file store with the reference identification.

7. The method of claim 1, further comprising processing payment based on the terms and the conditions of the digital contract.

8. A system comprising:

at least one processor; and a non-transitory computer-readable medium storing instructions that, when executed by the at least one processor, cause the at least one processor to perform operations comprising:

formalizing a digital contract between a registered product owner and a registered additive manufacturing vendor, the digital contract comprising a reference identification of a design file of the product, an identification of each of a plurality of registered additive manufacturing printers owned by the registered additive manufacturing vendor to be employed to manufacture additive product based on the design file, and an authorized quantity of products to be manufactured by the registered additive manufacturing vendor;

providing an access to the design file to the registered additive manufacturing vendor upon formalization of the digital contract to manufacture additive product using the plurality of registered additive manufacturing printers;

recording a print transaction data received from each of the plurality of registered additive manufacturing printers, the print transaction data comprising a quantity of products manufactured by the registered additive manufacturing printer; and terminating the digital contract by revoking the access to the design file when the quantity of products manufactured equals the authorized quantity of products to be manufactured or upon violation of the digital contract;

wherein the formalizing the digital contract further comprises initiating the digital contract with respect to the design file upon receiving a request from the registered additive manufacturing vendor or the registered product owner and, upon initiation, iteratively capturing terms and conditions between the registered product owner and the registered additive manufacturing vendor to manufacture additive product until an acceptance of the terms and the conditions, a rejection of the terms and the conditions, and an expiry of a pre-defined or a pre-configured time interval for acceptance.

9. The system of claim 8, wherein the operations further comprise registering a plurality of entities involved in a plurality of stages of additive manufacturing of the product, the plurality of entities comprising at least one of a product owner, a product designer, an additive manufacturing vendor, an additive manufacturing printer owned by the additive manufacturing vendor, an auditor, or a regulator.

10. The system of claim 9, wherein the registering the plurality of entities comprises:

creating a blockchain network comprising a plurality of nodes, and a single shared ledger for the plurality of nodes for storing a plurality of transactions with respect to the design file and the digital contract; and registering the plurality of entities as the plurality of nodes in the blockchain network.

11. The system of claim 10, wherein the providing the access to the design file comprises transferring a copy the design file to the registered additive manufacturing vendor using the blockchain network by:

creating the copy of the design file and a verifiable immutable transaction block corresponding to a transaction of transferring the copy of the design file; and recording a change made to the copy of the digital file in the shared ledger using the verifiable immutable transaction block.

12. The system of claim 8, wherein the operations further comprise:

receiving the design file from the registered product owner or a registered designer contracted by the registered product owner; and storing the design file in a de-centralized file store with the reference identification.

13. A non-transitory computer readable medium having stored thereon instructions comprising executable code which when executed by one or more processors, causes the one or more processors to:

formalize a digital contract between a registered product owner and a registered additive manufacturing vendor, the digital contract comprising a reference identification of a design file of the product, an identification of each of a plurality of registered additive manufacturing printers owned by the registered additive manufacturing vendor to be employed to manufacture additive product based on the design file, and an authorized quantity of products to be manufactured by the registered additive manufacturing vendor;

provide an access to the design file to the registered additive manufacturing vendor upon formalization of the digital contract to manufacture additive product using the plurality of registered additive manufacturing printers;

record a print transaction data received from each of the plurality of registered additive manufacturing printers, the print transaction data comprising a quantity of products manufactured by the registered additive manufacturing printer; and terminate the digital contract by revoking the access to the design file when the quantity of products manufactured equals the authorized quantity of products to be manufactured or upon violation of the digital contract;

wherein the formalize the digital contract further comprises initiating the digital contract with respect to the design file upon receiving a request from the registered additive manufacturing vendor or the registered product owner and, upon initiation, iteratively capture terms and conditions between the registered product owner and the registered additive manufacturing vendor to manufacture additive product until an acceptance of the terms and the conditions, a rejection of the terms and the conditions, and an expiry of a pre-defined or a pre-configured time interval for acceptance.

14. The non-transitory computer-readable medium of claim 13, wherein the instructions further comprise executable code which when executed by one or more processors, causes the one or more processors to:

register a plurality of entities involved in a plurality of stages to manufacture the additive product, the plurality of entities comprising at least one of a product owner, a product designer, an additive manufacturing vendor, an additive manufacturing printer owned by the additive manufacturing vendor, an auditor, or a regulator.

15. The non-transitory computer-readable medium of claim 14, wherein the instructions to register the plurality of entities further comprise executable code which when executed by one or more processors, causes the one or more processors to:

create a blockchain network comprising a plurality of nodes, and a single shared ledger for the plurality of nodes for storing a plurality of transactions with respect to the design file and the digital contract; and register the plurality of entities as the plurality of nodes in the blockchain network.

16. The non-transitory computer-readable medium of claim 15, wherein the instructions further comprise executable code which when executed by one or more processors, causes the one or more processors to:

create the copy of the design file and a verifiable immutable transaction block corresponding to a transaction of transferring the copy of the design file; and record a change made to the copy of the digital file in the shared ledger using the verifiable immutable transaction block.

17. The non-transitory computer-readable medium of claim 15, wherein the instructions further comprise executable code which when executed by one or more processors, causes the one or more processors to:

receive the design file from the registered product owner or a registered designer contracted by the registered product owner; and store the design file in a de-centralized file store with the reference identification.

* * * * *